United States Patent
Tomaru

(10) Patent No.: US 7,539,422 B2
(45) Date of Patent: May 26, 2009

(54) QUANTUM OPTICAL TRANSMISSION DEVICE

(75) Inventor: Tatsuya Tomaru, Hatoyama (JP)

(73) Assignee: Hitachi, Ltd., Tokyo (JP)

( * ) Notice: Subject to any disclaimer, the term of this patent is extended or adjusted under 35 U.S.C. 154(b) by 522 days.

(21) Appl. No.: 11/109,616

(22) Filed: Apr. 20, 2005

(65) Prior Publication Data

US 2005/0281561 A1   Dec. 22, 2005

(30) Foreign Application Priority Data

Jun. 22, 2004   (JP) ............................. 2004-183253

(51) Int. Cl.
*H04B 10/00* (2006.01)

(52) U.S. Cl. ..................................... 398/161; 398/152

(58) Field of Classification Search ................ 398/140, 398/146, 152, 161; 380/225, 278, 21
See application file for complete search history.

(56) References Cited

U.S. PATENT DOCUMENTS 7,305,091 B1 * 12/2007 Hirano ....................... 380/255

OTHER PUBLICATIONS

"Coherent Optical Communication", p. 49-50, Edited by Sadanori Shimada, Corona Publication Inc., 1988.
"Coherent Optical Communication", p. 25-26, Edited by Sadanori Shimada, Corona Publication Inc., 1988.
"Quantum Cryptography Using Pulsed Homodyne Detection", T. Hirano, H. Yamanaka, M. Ashikaga, T. Konishi, and R. Namiki, Physical Review A 68,042331 (2003).

* cited by examiner

*Primary Examiner*—Quan-Zhen Wang
(74) *Attorney, Agent, or Firm*—Antonelli, Terry, Stout & Kraus, LLP.

(57) ABSTRACT

In an optical detection method that requires a reference light such as homodyne detection, a signal light and the reference light must be equal to each other in the wavelength, and the phase relation between them must be maintained constant. In order to satisfy this requirement, the signal light and the reference light are extracted from the same light source and made equal to each other in the wavelength. The signal light and the reference light are transmitted so as to be temporally superimposed on each other with orthogonal polarizations to the same optical path, thereby making the external environments equal to each other to maintain the constant phase relation.

15 Claims, 7 Drawing Sheets

QUANTUM OPTICAL TRANSMISSION DEVICE

CLAIM OF PRIORITY

The present application claims priority from Japanese application JP2004-183253 filed on Jun. 22, 2004, the content of which is hereby incorporated by reference into this application.

FIELD OF THE INVENTION

The present invention relates to an optical communication using a quantum mechanical manner.

BACKGROUND OF THE INVENTION

A development of the advanced information society increasingly makes secure information transmission means important. In order to ensure the security of information, a cipher technology such as a public key cryptography has been currently widely employed. The public key cryptography requires an astronomical calculation for decryption, which supports the security of information. However, when a computer is further developed in the future, the decryption that cannot be currently performed may be enabled.

One of methods for coping with the above problem is to use a communication manner based on a quantum-mechanical principle. There have been various optical communication methods using the quantum mechanical manner.

From the viewpoint of the detecting method, the quantum optical communication is classified into two systems: one system requires a reference light and another system requires no reference light. In the system that requires the reference light, it is necessary that the signal light and the reference light are equal in the wavelength to each other, and the phases are synchronous with each other. The methods of obtaining the above reference light have been variously proposed and developed at a stage of developing a coherent optical communication system (Document "Sadakuni Shimada, Coherent optical communication, pp 49-50, published by Corona Corp. in 1988").

The basic structures for that system are that a local light source for the reference light is located at a detecting section, and the frequencies and the phases of a signal light and a local light source are adjusted within a given range by using a sophisticated electric circuit, which is a very difficult method. In order to minimize the difficulty, there is a method using a part of the signal light when generating the reference light (Document "Sadakuni Shimada, Coherent optical communication, pp 25-26, published by Corona Corp. in 1988"). However, when a part of the signal light is used for generation of the reference light, because the signal is quantum-mechanically destroyed depending on the used amount of signal light, the method using a part of signal light for generation of the reference light cannot be basically applied to the quantum information.

In general, as the reference light, a part of an output light from a light source that is used to generate the signal light is used, in the experiment of the quantum communication which is performed in a laboratory. With this structure, the signal light and the reference light are perfectly synchronous with each other, and the conditions needed for the reference light are satisfied. However, in the case where a method of transmitting the signal light and the reference light in different optical paths is used in a long-haul transmission out of the laboratory, the synchronization of the phases are not guaranteed because of the fluctuation of the phases which are attributable to a difference in the external environments of the respective optical paths. This problem is one of reasons that the quantum communication system that requires the reference light cannot be developed to a field experiment that is conducted out of a laboratory and further to a practical application stage.

In order to solve the above problem, there has been proposed a method in which the signal light and the reference light are generated with the same light source as a seed light, and those lights are transmitted in the same transmission path with a time lag (Document "T. Hirano, H. Yamanaka, M. Ashikaga, T. Konishi, and R. Namiki: Quantum cryptography using pulsed homodyne detection, Physical Review A 68, 042331 (2003)). As a result, the external environmental factors in the transmission are equal to each other, and the synchronization of the signal light and the reference light in the phase after the long-haul transmission is improved.

However, even in this method, the synchronization of the signal light and the reference light are not perfect. The nonlinearity of the optical fiber is generally small but becomes large as the net for the long-haul transmission due to the integral effect. The signal light and the reference light are different in the intensity, and moreover, the phase characteristic after transmission is different between the respective parts of reference light due to the intensity fluctuations through the nonlinearity effect.

In addition, there generally arises such a problem on the loss in the quantum communication in addition to a problem on the phase synchronization. When the above quantum signal is partially extracted, the quantum state is destroyed as much as the extracted amount. This supports that the quantum communication is secure. Even if the quantum signal is not intentionally partially extracted, the signal is partially destroyed by the transmission loss. Accordingly, in order to transmit the quantum signal at a long distance, a breakthrough technique is required.

SUMMARY OF THE INVENTION

A quantum communication system that requires the reference light is required to synchronize the signal light and the reference light in the detecting section. As described above, it is difficult to generate the reference light that is synchronous with the signal light in the detecting section. Also, even if the reference light is generated at the transmission side and then transmitted by means of the same transmission path so as not to temporally overlap with the signal light, because the nonlinear effects during the transmission are different depending on the optical intensities, it is difficult to synchronize the phases of the signal light and the reference light after transmission. In addition, when the quantum signal suffers from a transmission loss, a part of quantum signal is destroyed according to the transmission loss.

An object of the present invention is to solve problems on the phase synchronization and the signal destruction. Not only the signal light and the reference light are transmitted through the same fiber but also those lights are temporally superimposed on each other by the orthogonal polarizations for transmission.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

First Embodiment

Figure 1:
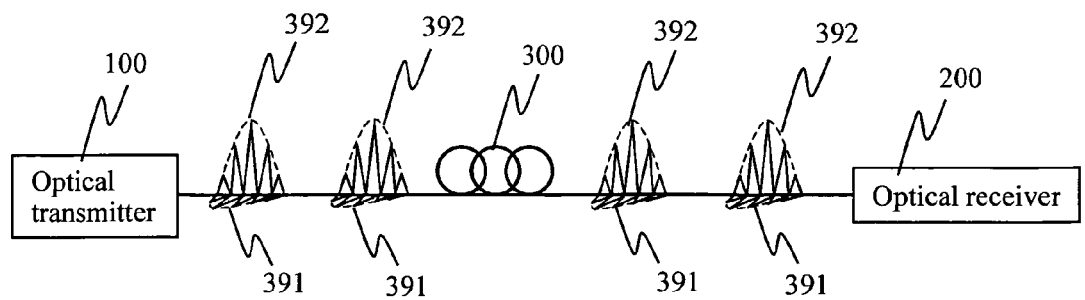
FIG. 1 is a diagram showing a system structure according to one of basic configurations of the present invention, that is, a diagram showing an optical transmitter/receiver system in which a signal light and a reference light are transmitted to the same optical path in such a manner as to be temporally superimposed on each other by polarizations that are orthogonal.

FIG. 1 is a diagram showing a system structure according to one of basic configurations of the present invention. A signal light 391 and a reference light 392 which have been output from an optical transmitter 100 to an optical fiber 300 are temporally superimposed on each other with the orthogonal polarization, and then transmitted to an optical receiver 200. The signal light 391 and the reference light 392 are generated with an identical light-source as a seed light, and transmitted while being temporally superimposed on each other with the orthogonal polarizations. Therefore, those phases are synchronous with each other when those signals are detected by the optical receiver 200.

Figure 2:
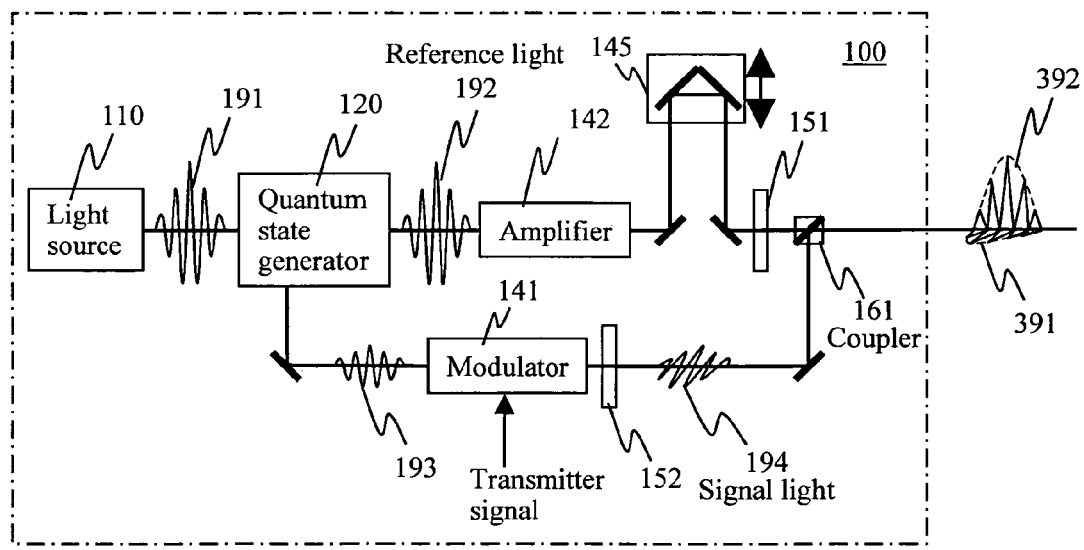
FIG. 2 is a block diagram showing an example of the structure of a transmitter for generating a polarized signal light and a polarized reference light which are temporally superimposed on each other with the same light source as a seed light.

FIG. 2 is a block diagram showing an example of the structure of a transmitter for generating the signal light 391 and the reference light 392 that are temporally superimposed on each other by the orthogonal polarizations with an identical light source as the seed light. Reference numeral 110 denotes a light source, and 191 is an output light from the light source 110. A quantum state generator 120 generates a quantum light 193. In the case where the squeezed state is considered as the quantum light 193, there are proposed, as a method of generating the quantum light, a method using a parametric down conversion (R. E. Slusher, et al., "Observation of squeezed stages generated by four-wave mixing in an optical cavity," Phys. Rev. Lett. 55, 2409-2412 (1985); E. S. Polzik, J. Carry, and H. J. Kimble, Appl. Phys. B 55, 279 (1992)), and a method using an optical fiber and a beam splitter (M. Shirasaki and H. A. Haus, "Squeezing of pulses in a nonlinear interferometer," J. Opt. Soc. Am. B7, 30-34 (1990)).

The quantum light 193 is generated by a part of the output light 191 of the light source 110 from the viewpoint of an energy. A component 192 that has not been transferred to the quantum state is used as the reference light. The reference light 192 is amplified by an amplifier 142 if necessary. A transmitter signal is superimposed on the quantum light 193 by a modulator 141 to provide a quantum signal light 194. In this situation, signals for checking the synchronous relation with the reference light in the optical receiver 200 may be conveniently inserted at given intervals in the quantum signal 194. Checking the synchronous relation can be achieved through setting the degree of modulation in the modulator 141 to a predetermined value.

The signal light 194 is the polarized light that are orthogonal to the reference light 192 and coupled with the reference light 192 by a coupler 161, and transmitted in an optical fiber 300. It is simple that the coupler 161 is made up of a polarizing beam splitter. The polarizing beam splitter couples the linearly polarized lights that are orthogonal to each other together, and the reference light 192 and the signal light 194 that are two input lights to the coupler 161 are adjusted to the suitable polarizations by polarization controllers 151 and 152. Usually, since the reference light 192 and the quantum light 193 are linearly polarized lights, the polarization controllers 151 and 152 can achieve its object by a half-waveplate for each. Reference numeral 145 denotes an optical delay unit, and its position is variable as indicated by an arrow. The optical delay unit 145 is used to adjust a timing of the reference light 192 that has been introduced into the coupler 161.

In the drawing, the reference numeral and description of mirrors having a function of merely changing the beam directions will be omitted. The same is applied to the subsequent drawings.

As the optical fiber 300, both of a polarization maintaining fiber and a polarization non-maintaining fiber can be applicable. In the system using the polarization maintaining fiber, there may be an option in which a fast axis and a slow axis of the polarization maintaining fiber are exchanged with each other every given length, and in which the total time required for transmission are made substantially equal to each other with respect to two polarization directions.

Figure 3:
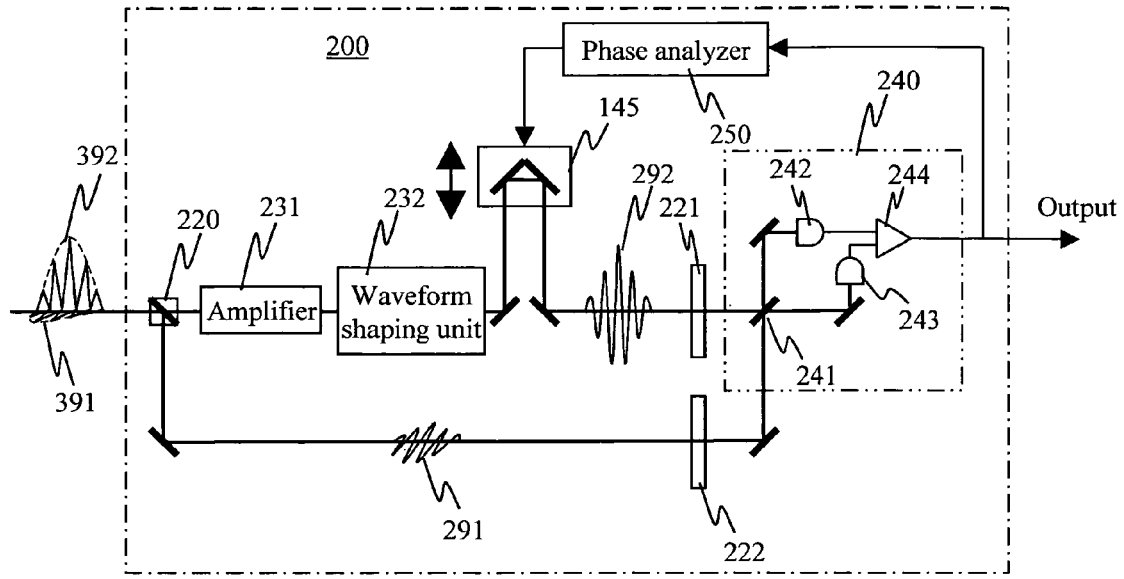
FIG. 3 is a block diagram showing an example of the structure of a receiver in the case where the polarizations of a reference light and a signal light are specified.

In the case where the polarization maintaining fiber is used as the optical fiber 300, and the polarizations of the reference light 392 and the signal light 391 are specified, the structure of the receiver 200 may be relatively simple. FIG. 3 is a block diagram showing an example of the structure of the receiver in the case where the polarizations of the reference light 392 and the signal light 391 are specified. First, the signal light 291 and the reference light 292 are split by a beam splitter 220. It is simple that the beam splitter 220 is formed of a polarizing beam splitter. The split reference light 292 is amplified and shaped in the waveform through the an amplifier 231 and a waveform shaping unit 232 as occasional demands, and its optical length is adjusted by the optical delay unit 145, and then guided to a beam splitter 241 having a split ratio of 50:50, and then interferes with the signal light 291.

In order to make the signal light 291 and the reference light 292 interfere with each other, it is necessary that the polarizations of those lights coincide with each other, and the optical path lengths also coincide with each other in the phase level. Polarization controllers 221 and 222 are disposed for the former purpose, and half-waveplates can achieve the purpose in view of the fact that the signal light 291 and the reference light 292 are normally linearly polarized. The optical delay unit 145 is disposed to adjust the optical path length, which is the latter purpose. There are various methods with respect to the beam splitter 241, and there is a method using the polarizing beam splitter as well as the ordinary beam splitter or fiber coupler.

Two lights that has passed through the beam splitter and interfered with each other are detected by photo-detectors 242 and 243, respectively. The photo-detectors 242 and 243 may be formed of photodiodes or photomultipliers. Detection signals from the photo-detectors 242 and 243 are processed by an electric circuit 244 to provide output signals. A Part of the output signals is guided into a phase analyzer 250, and the phase analyzer 250 analyzes a phase difference between the signal light 291 and the reference light 292, and the phase difference is fed back to the optical delay unit 145 so as to optimize the phase difference.

Figure 4:
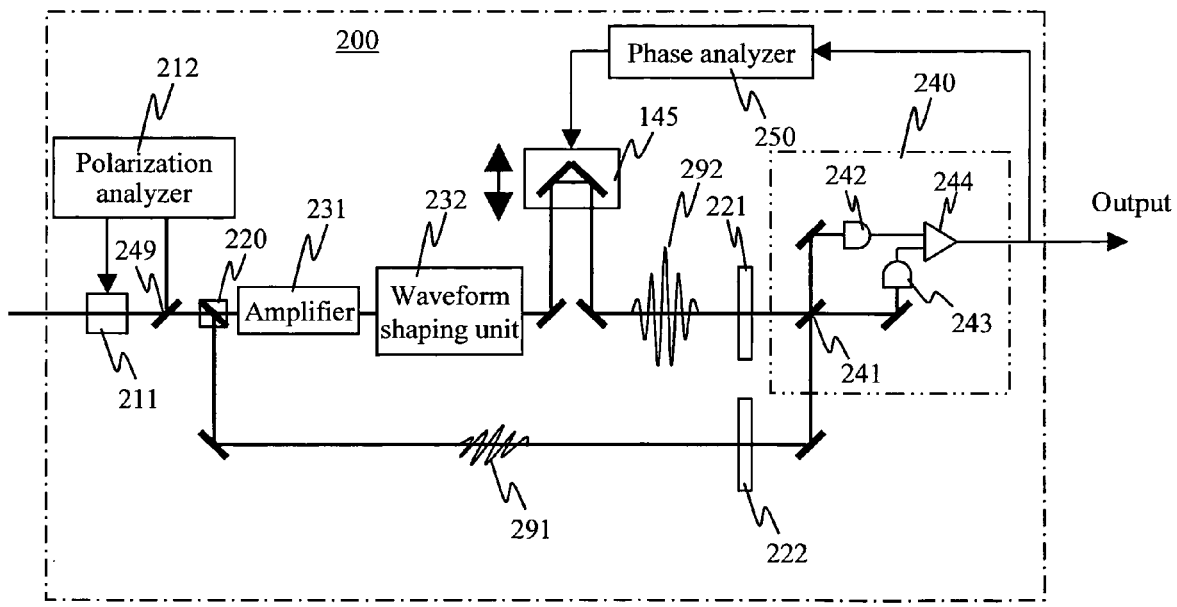
FIG. 4 is a block diagram showing an example of the structure of a receiver in the case where a polarization controller is located before an input of a beam splitter.
Figure 5:
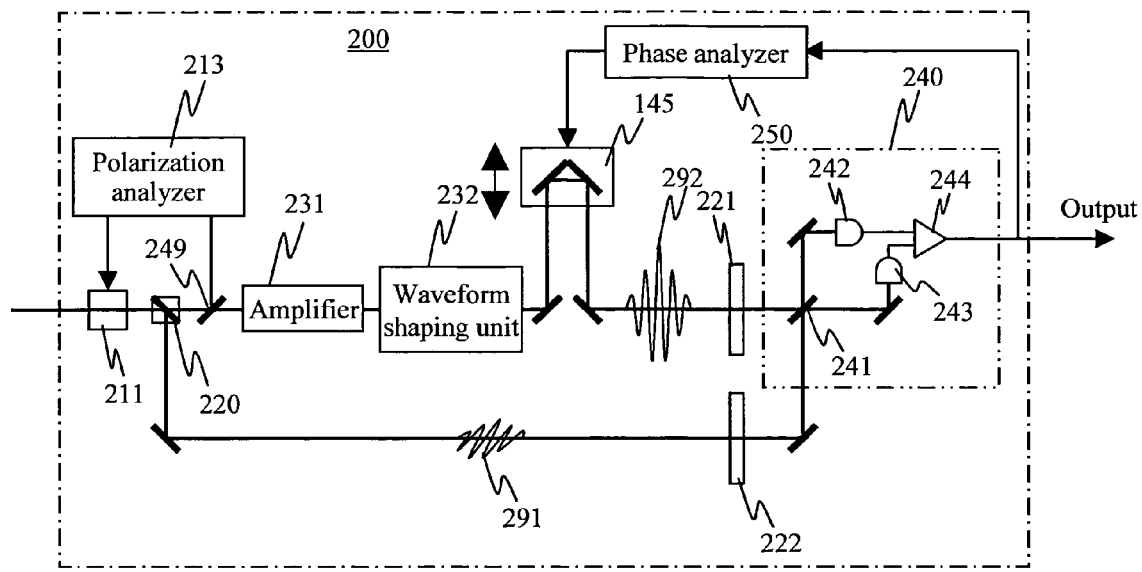
FIG. 5 is a block diagram showing another example of the structure of a receiver in the case where a polarization controller is located before the input of the beam splitter.
Figure 6:
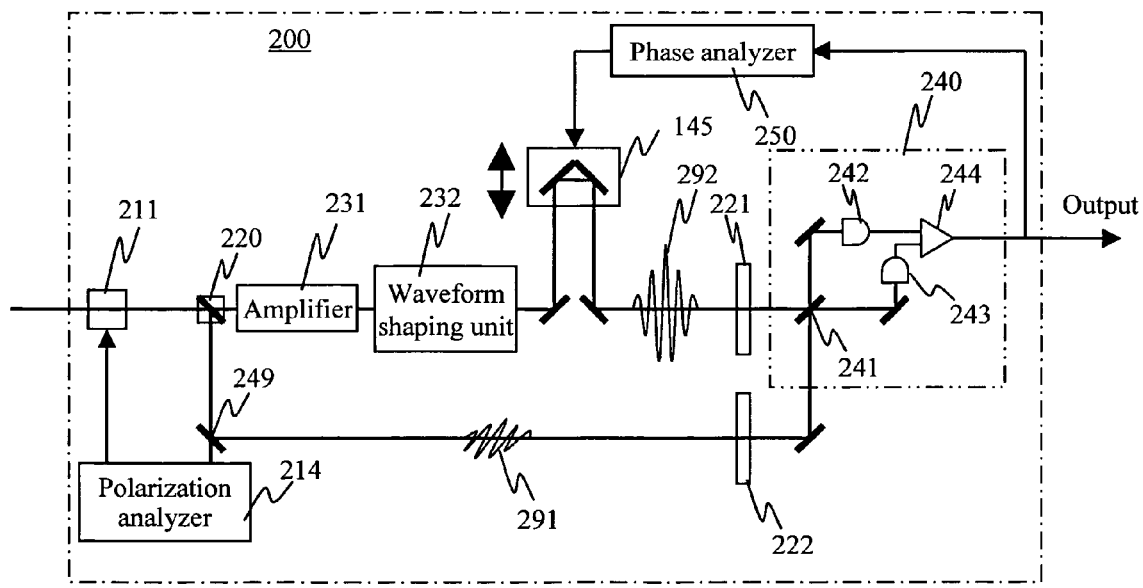
FIG. 6 is a block diagram showing still another example of the structure of a receiver in the case where the polarization controller is located before the input of the beam splitter.

Even in the case of using an ordinary optical fiber that does not maintain the polarization for the optical fiber 300, or even in the case of using the polarization maintaining fiber, when the polarization is intended to be adjusted, the receiver 200 has the polarization controller 211 located before an input into the beam splitter 220. FIGS. 4 to 6 are block diagrams showing the structure of the receiver in the case where the polarization controller 211 is located before an input into the splitter 220, respectively. In the case where the polarizing beam splitter is used for the splitter 220, the signal light is adjusted to be the linearly polarized light by the polarization controller 211. The plane of polarization of the light that has been transmitted to the receiver 200 is analyzed by the polarization analyzer 212, 213, or 214.

The polarization analyzer 212 may be located at various positions, and there are a case in which a part of the light is split by the beam splitter 249 in front of the splitter 220 (FIG. 4), a case in which a part of the reference light is split by the beam splitter 249 at the rear of the splitter 220 (FIG. 5), and a case in which a part of the signal light is split by the beam splitter 249 at the rear of the splitter 220 (FIG. 6). In any cases, the analyzed results are fed back to the polarization controller 211. The structures of the receivers 200 shown in FIGS. 4 to 6 are identical with the structure of the receiver 200 shown in FIG. 3 except for a partial extraction of the signal to the polarization controller 211.

Figure 7:
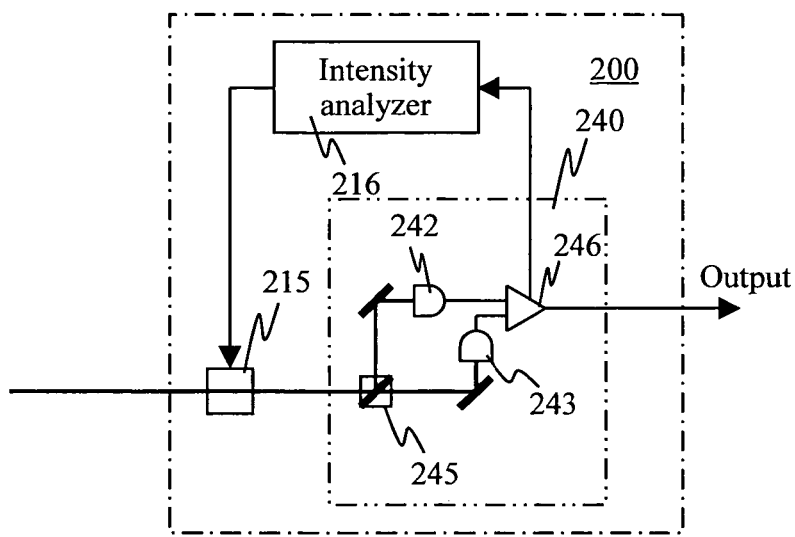
FIG. 7 is a block diagram showing a structural example of a receiver in the case where there is no need of amplifying and waveform-shaping the reference light.

In the case where it is unnecessary to amplify and waveform-shape the reference light in the receiver, the receiver 200 can be simply structured. FIG. 7 is a block diagram showing a structural example of the receiver in the case where it is unnecessary to amplify and waveform-shape the reference light. The polarization controller 215 is adjusted such that the reference light becomes the linearly polarized light with an angle of 45° with respect to the P-polarization, where P-polarized light is transmitted at the polarizing beam splitter 245, and the reference light is divided into two lights by the polarizing beam splitter 245. In this situation, the signal light is also divided into two lights at the same time, and the respective divided reference and signal beams interfere with each other. The respective beams that have interfered with each other are converted to electric signals by the photo-detectors 242 and 243, and then processed by an electric circuit 246. Because the relative detection intensities of the photo-detectors 242 and 243 depend on the input polarization to the polarizing beam splitter 245, the intensities are fed back to the polarization controller 215 through the intensity analyzer 216 so that the input intensities of the photo-detectors 242 and 243 become equal to each other.

Second Embodiment

Figure 8:
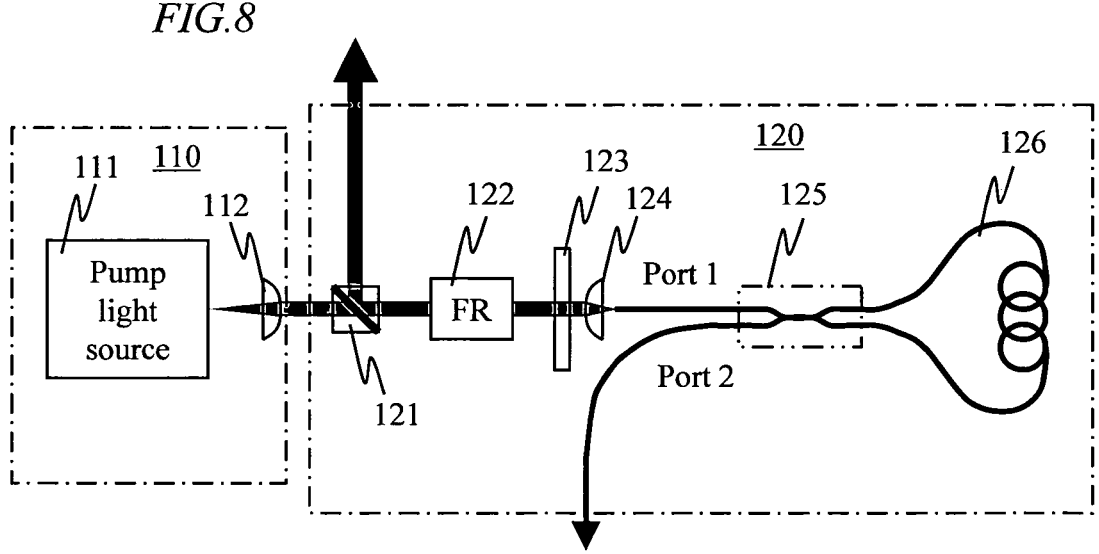
FIG. 8 is a block diagram showing one example of a quantum state generator including a fiber coupler that splits a pump light to 50:50 in order to generate a squeezed light by means of an optical fiber.

Various configurations of the quantum state generator 120 in the transmitter 100 can be proposed. FIG. 8 is a block diagram showing one example of methods of generating a squeezed light by means of an optical fiber. The quantum state generator 120 is made up of a fiber coupler 125 that splits a pump light to 50:50. The light source 110 is made up of a pump light source 111 and a collimator lens system 112. The pump light source 111 is appropriately selected according to a wavelength to be used. For example, when a 1.5 μm band that is an ordinary communication-wavelength is used, a femtosecond $Cr^{4+}$: YAG laser or an Er-doped fiber laser is selected. The collimator lens system 112 is not limited to a single lens but appropriately selected according to the output specification of the pump light source 111.

An output light from the pump light source 111 is collimated by the lens system 112 and then input to a polarizing beam splitter 121. The polarization of the pump light is arranged in such a manner that an incident light passes through the polarizing beam splitter 121. In some situations, a polarization controller is disposed between the lens system 112 and the polarizing beam splitter 121 to control the plane of polarization. The light that has passed through the polarizing beam splitter 121 passes through a Faraday rotator 122, and the plane of polarization rotates by 45°. Then, the light is input to a polarization maintaining fiber 126 through a half-waveplate 123 and a collimator lens 124. The half-waveplate 123 is disposed such that the plane of polarization of the light input to the polarization maintaining fiber 126 coincides with the optical axis of the fiber. The light that has been input to the fiber 126 is split by the fiber coupler 125 to 50:50, propagated in opposite directions to each other, and then coupled again by the fiber coupler 125. All of the propagated light within the fiber 126 is output to the port 1 after the interference at the coupler 125 if the propagation is described in a linear equation. However, if the Kerr effect is considered in the fiber 126, the balance at the coupler 125 is slightly disordered, and an output appears at the port 2 (see the above-mentioned document "Shirasaki"). The slight output is a quantum light 193 that is called "squeezed light". The light that has been returned to the port 1 is a non-quantum light, and passes through the collimator lens 124 and the half-waveplate 123, and is then guided to the polarizing beam splitter 121 after the plane of polarization rotates by 45° through the Faraday rotator 122. Since the light passes through the Faraday rotator 122 twice in reciprocation, the plane of polarization rotates by 90° in total. At this time, the light is reflected by the polarizing beam splitter 121. The reflected light is used as the reference light 192.

A system that is made up of the optical fiber 126 and the fiber coupler 125 forms an interferometer, and it is desirable that the lights that are propagated in the opposite direction to each other within the fiber 126 is stable with respect to fluctuations that depend on the environments. In general, there are many cases in which the system on which the nonlinear effect is included is unstable with respect to the fluctuations. However, there has been known an optical soliton that is stably propagated in the fiber by balancing the wavelength dispersion and the Kerr effect of the fiber. The condition for forming the soliton can be evaluated by using the following expression (1) defining the order N of the soliton. The soliton order N is given by Expression (1) and Expression (2) assuming that the pulse width is $T_0$, the group-velocity dispersion of the fiber is $\beta_2$, the nonlinear refractive index is $n_2$, the effective cross section is $A_{eff}$, and the light velocity is c (G. P. Agrawal, "Nonlinear fiber optics," $2^{nd}$ed. (Academic Press, New York (1995): Expression (5.2.3) and Expression (2.3.28)).

$$N^2 = \gamma P_0 T_0^2 / |\beta_2| \qquad (1)$$

$$\gamma = n_2 \omega / c A_{eff} \qquad (2)$$

where the pulse width $T_0$ is a parameter when the pulse waveform is $\text{sech}^2 (t/T_0)$. $\gamma$ is a parameter representative of Kerr effect and expresses a phase variation per unit length and unit intensity. The case of N=1 is a fundamental soliton which is most important in practical use, and in this example, a target specification is to obtain N=1. In order to effectively use the Kerr effect of the fiber, the effective cross section is preferably smaller. The currently available polarization maintaining fiber for 1.5 μm band which has the smaller effective cross section is an ordinary-dispersion fiber whose mode field diameter is MFD=5.5 μm (the ordinary polarization maintaining fiber is about 10.5 μm). When a femtosecond $Cr^{4+}$: YAG laser is assumed as the pump light source with a repetition rate of 1 GHz and an effectively available mean output intensity of 100 mW, one of the mean input intensities to the fiber 126 becomes 50 mW, taking into consideration the fact that the intensity is split into two by the fiber coupler 125. The average power is divided by 1 GHz to obtain $I_0$=50 pJ as an energy per one pulse, and $T_0 P_0$=25 pJ is obtained from a relation of $I_0 = 2 T_0 P_0$. When the wavelength is λ=1.525 μm, assuming that $|\beta_2|$=20 $ps^2$/km and $n_2$=2.66×$10^{-20}$ $m^2$/W are satisfied as the ordinary-dispersion fiber, $T_0$=170 fs is obtained for the case of N=1. When the pulse width is expressed by a full width at half maximum, it becomes 300 fs.

Through the above estimate, when the $Cr^{4+}$: YAG laser is operated so that the pulse width becomes about 300 fs under the above conditions, the squeezed state can be stably generated while the soliton condition is satisfied in the fiber 126. Since the intensity of squeezing depends on the length of the fiber 126, the length is determined as occasion demands. The fiber is used with the length of about several meters to several tens of meters.

The quantum state generator 120 is structured as described above. The quantum light and the non-quantum light which have been generated in the quantum state generator 120 are transmitted through the optical fiber 300 after having been subjected to necessary processing within the optical transmitter 100. When the optical pulse is transmitted through the fiber, the pulse gets generally destroyed through the transmission due to the wavelength dispersion and the nonlinear effect. This is a phenomenon common to the signal light and the reference light. Because the nonlinear effect depends on the optical intensity, there is generally a difference in the effect between the signal light and the reference light. In addition, there is a difference in the nonlinear effect between the respective parts of reference light due to the intensity fluctuation. Accordingly, there is a possibility that the reference light cannot perform stable and exact functions in the receiver.

A method of preventing the above drawback is realized, for the reference light, by satisfying the soliton condition to impede the instability with respect to the nonlinear effect, and for the signal light, by making the signal light spatially and temporally coincide with the reference light with the orthogonal polarization. In this case, the reference light traps the signal light through so-called cross-phase modulation between the signal light and the reference light due to the third-order nonlinear effect. Because the signal light is extremely weak, the transmission characteristics are mostly determined by the reference light. In the process of generating the squeezed light, an optical soliton has been generated in the fiber 126. If the soliton can be maintained and transmitted through the optical fiber 300, the signal trapped by the soliton is transmitted without any problem.

Various types of optical fibers 300 have been proposed. First, let us consider an ordinary normal-dispersion fiber whose mode field diameter is 10.5 μm. In order to satisfy the soliton condition for a optical pulse of $T_0$=170 fs (full width at half maximum 300 fs), the mean intensity 186 mW is required by using the above expressions (1) and (2) in the case of λ=1.525 μm and 1 GHz. Because the intensity of the non-quantum light emitted from the above quantum state generator 120 is about 100 mW, the intensity is insufficient for the soliton condition, and it must be amplified by an amplifier 142. Because the above condition greatly depends on the parameters such as a dispersion value $\beta_2$, the soliton condition can be satisfied with a low optical intensity by using the dispersion shift type or non-zero dispersion shift type optical fiber which is, for example, small in the absolute value of $\beta_2$, and an amplification is not needed. When the reference light can be the soliton as described above, the reference light can be stably transmitted. In that case, the signal light is trapped by the reference light and is then transmitted. In the above condition, since the pulse width of the reference light is 300 fs, several tens of femtoseconds or less may be required in the time accuracy for the overlapping of the signal light and the reference light at the coupler 161 in the optical transmitter 100.

There has been found that the signal light and the reference light can be stably transmitted by the formation of the optical soliton. An optical soliton can be transmitted stably in an optical fiber in spite of the use of the nonlinear effect, and the optical soliton has the effect of reducing the intensity fluctuation among the optical pulses during a transmission. When an intensity squeezed state is used as the signal light, the intensity-fluctuation squeezing effect of the soliton may cancel the deterioration of the intensity-squeezed state, for the case where squeezing is deteriorated by the transmission loss.

When the reference light satisfies the soliton condition, the self-phase modulation effect due to the Kerr effect which is the third-order nonlinear effect of an optical fiber is balanced with the wavelength dispersion of the optical fiber, and the soliton is formed and then stably transmitted. The third-order nonlinear effect of the optical fiber not only modulates the self-phase, but also phase-modulates all of lights that are temporally superimposed on each other. When the signal light and the reference light are temporally superimposed on each other, the reference light modulates the phase of the signal light, and the signal light satisfies the soliton condition, and the signal light is trapped by the reference light and transmitted. Because the signal light is perfectly synchronous with the reference light and then transmitted as described above, the signal light also undergoes the effects that are attributable to the fluctuations originally provided to the reference light, which are fluctuations of the reference light itself and environments. In the detecting system where the reference light and the signal light interfere with each other, those fluctuation effects are cancelled between the signal and reference lights, and an interferometric detection such as homodyne detection can be performed even after the long-haul transmission.

When the signal light is in a squeezed state, there is an optional effect. The Kerr effect and the wavelength dispersion of the optical fiber cooperate to reduce the intensity fluctuations of the optical pulses. Generally, a transmission loss converts a squeezed fluctuation into a vacuum fluctuation. Therefore, the transmission loss has the effect of destroying the squeezed state. This makes it difficult to conduct the long-haul transmission in quantum communications. When the squeezed state in which the fluctuation is squeezed in the amplitude direction is utilized for the signal transmission, the effect of reducing the intensity fluctuation is also exerted on the signal light through the effect of reducing the intensity fluctuation on the reference light. As a result, the intensity fluctuation-reducing effect of the signal light cancels the squeezing-deteriorating effect which is attributable to the transmission loss. This cancellation enables the long-haul transmission of the squeezed state or that on the quantum communication.

Also, it is possible to let the reference light amplify the signal light during the transmission. This is because the signal light might be amplified by the Raman effect of the optical fiber if the reference light is regarded as the excited light. The transmission-distance limit of the quantum state may be remarkably relaxed by using the fluctuation squeezing effect and the Raman amplification effect of the optical fiber.

Third Embodiment

Figure 9:
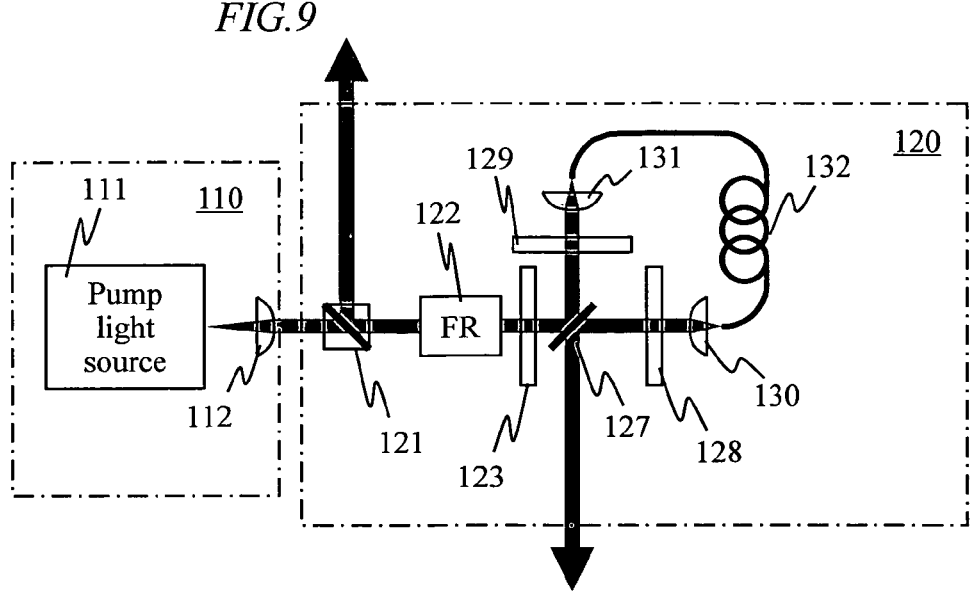
FIG. 9 is a block diagram showing one example of a quantum state generator including a beam splitter that splits a pump light to 50:50 in order to generate a squeezed light by means of an optical fiber.

FIG. 9 is a block diagram showing an example of methods of generating a squeezed light by means of an optical fiber. The quantum state generator 120 is made up of a beam splitter 127 that splits the pump light to 50:50. The output light from the excited light source 111 is collimated by the lens system 112, passes through the polarizing beam splitter 121, the Faraday rotator 122, and the half-waveplate 123, and is then guided to the beam splitter 127. In the beam splitter 127, the beam is split into two, and one of the split beams is input to a polarization maintaining fiber 132 through a half-waveplate 128 and a lens 130, and another split beam is input to the polarization maintaining fiber 132 through a half-waveplate 129 and a lens 131. The half-waveplate 123 adjusts the input polarization to the beam splitter 127, and the half-waveplates 128 and 129 make the polarization of the incident light coincide with one of the optical axes of the fiber 132. The functions of the third embodiment are basically identical with those of the second embodiment. The reference light 192 is obtained from the polarizing beam splitter 121, and the quantum light is obtained from the beam splitter 127.

Fourth Embodiment

The methods of generating the squeezed light are shown in FIGS. 8 and 9. It is possible to generate two squeezed states at the same time by using those structures.

A two-mode squeezed state can be generated by coupling two independent squeezed states by the beam splitter with an appropriate phase relation (G. Yeoman et al., "Two-mode squeezed Gaussons," J. Mod. Opt. 40, 1497-1530 (1993)). Also, two outputs of the two-mode squeezed state are quantum-mechanically entangled with each other (A. Furusawa et al., "Unconditional quantum teleportation," Science 282, 706 to 709 (1998), and the entangled quantum lights can be used for the signal light.

Figure 10:
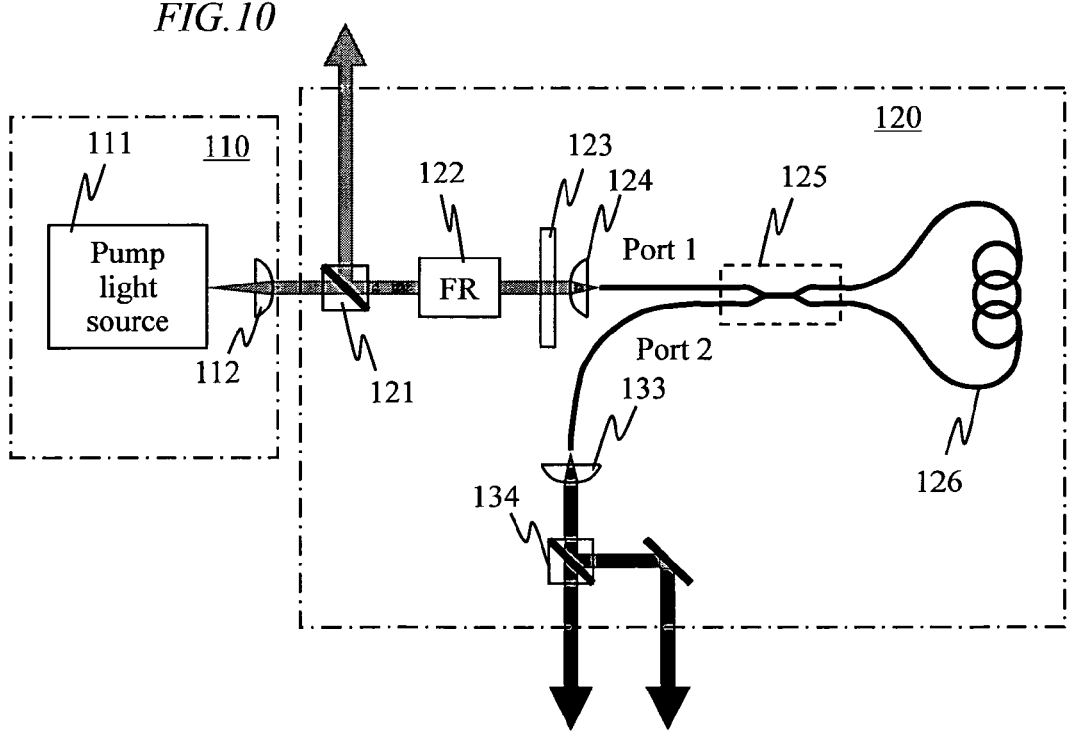
FIG. 10 is a block diagram showing a structural example that generates two squeezed states of polarizations that are orthogonal to each other at a port 2, on the basis of the structure shown in FIG. 8.

FIG. 10 is a block diagram showing a structural example that generates two squeezed states of polarizations that are orthogonal to each other at the port 2, on the basis of the structure shown in FIG. 8. In FIG. 8, the half-waveplate 123 is adjusted to make the plane of polarization of the input light coincide with the optical axis of the polarization maintaining fiber 26. However, in FIG. 10, the half-waveplate 123 is adjusted to have the plane of polarization of the incident light inclined with respect to the optical axis of the polarization maintaining fiber 126 by 45°. In the structure of FIG. 10, two polarization components corresponding to the two optical axes of the polarization maintaining fiber 126 are propagated. As a result, two squeezed states with orthogonal polarizations are generated at the port 2. When those two polarization components are split by means of the polarizing beam splitter 134, two squeezed states are generated at the same time.

Figure 11:
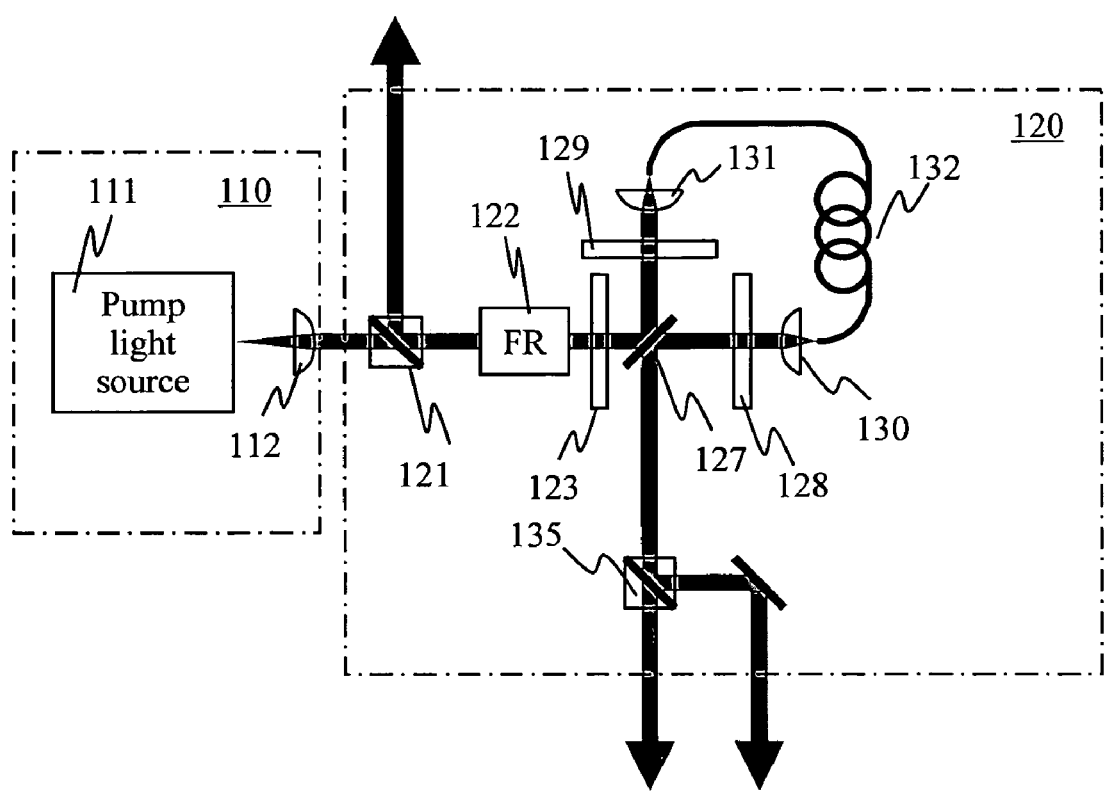
FIG. 11 is a block diagram showing a structural example that generates two squeezed states of polarizations that are orthogonal to each other at an output side of a beam splitter, on the basis of the structure shown in FIG. 9.

FIG. 11 is a block diagram showing a structural example that generates two squeezed states of polarizations that are orthogonal to each other at the output side of the beam splitter 127, on the basis of the structure shown in FIG. 9. In this example, it is necessary that the beam splitter 127 is set to 50:50 with respect to both of two polarizations. The optical axis of the polarization maintaining fiber 132 and the plane of polarization of the incident light form an angle of 45° by using the half-waveplates 123, 128 and 129 to generate two squeezed states that are orthogonal to each other, as in the case of FIG. 10. When those two squeezed states are split by means of the polarizing beam splitter 135, two squeezed lights can be extracted from one quantum state generator 120 at the same time.

Figure 12:
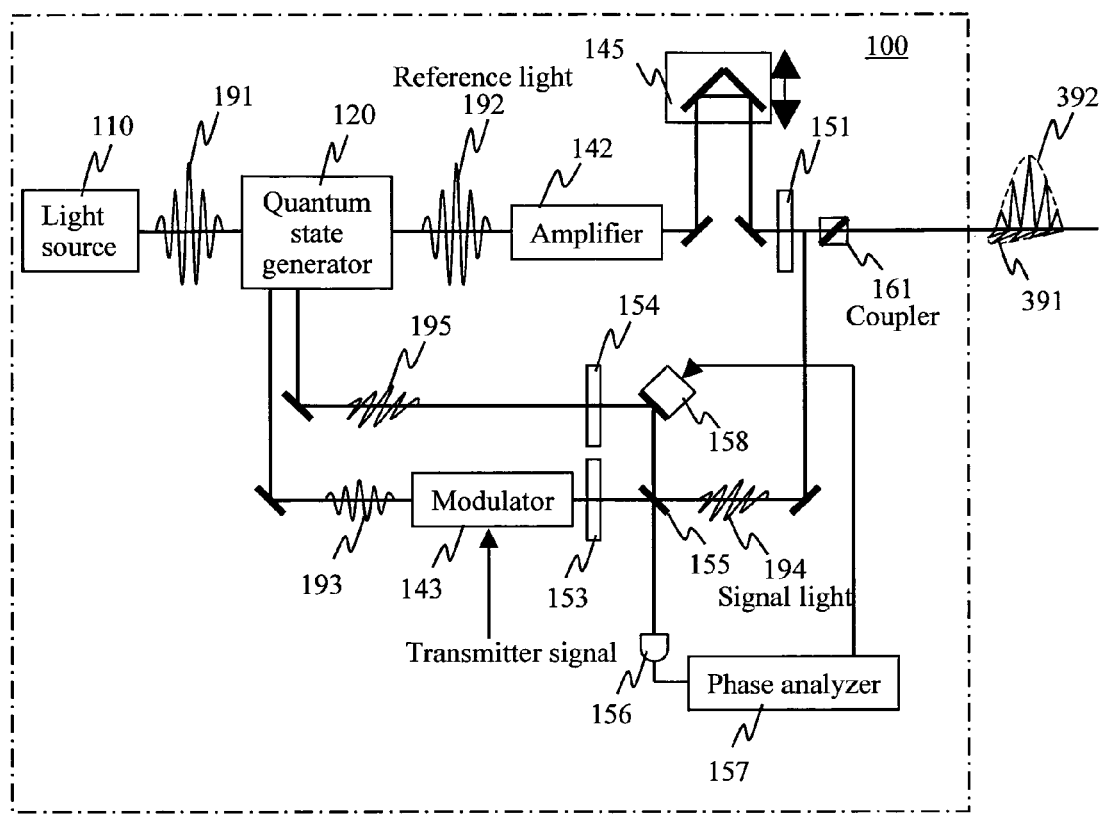
FIG. 12 is a block diagram showing a structural example of the generation of a signal light by using a two-mode squeezed state.

When two squeezed lights can be generated by the structure shown in FIG. 10 or FIG. 11, a two-mode squeezed state can be generated and used for the signal light. FIG. 12 is a block diagram showing a structural example of using a two-mode squeezed state as the signal light. A modulator 143 is used for one of two quantum lights (squeezed states) 193 and 195 which are output from the quantum state generator 120 to superimpose the transmission signal. The polarizations of the two quantum lights are adjusted to coincide with each other by half-waveplates 153 and 154, and then coupled together by a beam splitter 155. As a result, a signal light 194 thus generated becomes a two-mode squeezed state. The subsequent signal processing method is identical with that in the first embodiment. Another synthetic light that has been generated in the beam splitter 155 is received by a photo-detector 156 in which the phase relation between the two quantum lights 193 and 195 is analyzed. The result analyzed by a phase analyzer is fed back to a movable mirror 158 to maintain a constant phase relation between the quantum lights 193 and 195.

Two beams of a two-mode squeezed state that has been synthesized by the beam splitter 155 are quantum-mechanically entangled with each other. A further skilled signal transmission method can be constructed by using the entangled beam pair. In the fourth embodiment, only one of the quantum lights 193 and 195 is modulated, but both thereof may be modulated, and a further skilled signal transmission method can be constructed.

The signal light and the reference light are transmitted so as to be temporally superimposed on each other with the result that the signal light is trapped by the reference light and transmitted. Because the signal light is thus transmitted in complete synchronization with the reference light, the signal light also undergoes the effects that are attributable to the fluctuations originally provided to the reference light, which are fluctuations of environments and the reference light itself. In the detecting system where the reference light and the signal light interfere with each other, those fluctuation effects are cancelled between the signal and reference lights, and an interferometric detection such as homodyne detection can be performed even after the long-haul transmission.

The present invention provides a method for realizing the high-security quantum communication. The security of information is important in infrastructures for supporting the advanced information society, and the present invention is employed to realize the society that assures the security.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention is defined by the claims appended hereto, and their equivalents.

Reference numeral in the drawings is indicated as follows:

Reference numeral 100 denotes an optical transmitter, 110 is a light source, 111 is a pump light-source, 112 is a collimator lens system, 120 is a quantum state generator, 121 is a polarizing beam splitter, 122 is a Faraday rotator, 123 is a half-waveplate, 124 is a lens, 125 is a fiber coupler, 126 is an optical fiber, 127 is a beam splitter, 128 is a half-waveplate, 129 is a half-waveplate, 130 is a lens, 131 is a lens, 132 is an optical fiber, 133 is a lens, 134 is a polarizing beam splitter, 135 is a polarizing beam splitter, 141 is a modulator, 142 is an amplifier, 143 is a modulator, 145 is an optical delay unit, 151 is a polarization controller, 152 is a polarization controller, 153 is a polarization controller, 154 is a polarization controller, 155 is a beam splitter, 156 is a photo-detector, 157 is a phase analyzer, 158 is a movable mirror, 161 is an optical coupler, 191 is an output light from the light source 110, 192 is a reference light, 193 is a quantum light, 194 is a signal light, 195 is a quantum light, 200 is an optical receiver, 211 is a polarization controller, 212 is a polarization analyzer, 213 is a polarization analyzer, 214 is a polarization analyzer, 215 is a polarization controller, 216 is an intensity analyzer, 220 is a splitter, 221 is a polarization controller, 222 is a polarization controller, 231 is an amplifier, 232 is a waveform shaping unit, 241 is a beam splitter, 242 is a photo-detector, 243 is a photo-detector, 244 is an electric circuit, 245 is a polarizing beam splitter, 246 is an electric circuit, 250 is a phase analyzer, 291 is a signal light, 292 is a reference light, 300 is an optical fiber, 391 is a signal light, and 392 is a reference light.

What is claimed is:

1. An optical transmitter/receiver system having an optical transmitter comprising:
   a quantum state generator having one light source as a pump source;
   a modulator that superimposes a signal on a quantum state that is output from the quantum state generator to provide a signal light;
   a polarization controller for the signal light that is output from the modulator;
   an optical delay unit that adjusts an optical path length of a reference light which is a non-quantum light that is emitted from the quantum state generator;
   a polarization controller for the reference light; and
   a polarizing beam coupler that couples the signal light and the reference light whose polarizations are orthogonal to each other where the signal light and the reference light are spatially and temporally superimposed on each other and the signal light is trapped by the reference light in the optical fibers connecting the transmitter with the receiver through the third-order nonlinear effect of the optical fibers.

2. The optical transmitter/receiver system according to claim 1, wherein the quantum state generator generates a squeezed state.

3. The optical transmitter/receiver system according to claim 1, wherein the quantum state generator generates a two-mode squeezed state.

4. The optical transmitter/receiver system according to claim 1, wherein the quantum state generator generates a quantum-mechanically entangled state.

5. The optical transmitter/receiver system according to claim 1, wherein the optical receiver comprises:
   an optical splitter that splits the signal light and the reference light which are temporally superimposed on each other with the orthogonal polarizations;
   a polarization controller for the signal light;
   an amplifier for the reference light;
   a waveform shaping unit for the reference light;
   an optical delay unit that adjusts an optical path length of the reference light;
   a polarization controller for the reference light;
   an optical coupler/splitter for interfering the signal light and the reference light with each other;
   two photo-detectors that detect the signal light and the reference light which have been interfered with each other; and
   an electric circuit that processes the interfered signal- and reference-lights which are detected by the photo-detectors.

6. The optical transmitter/receiver system according to claim 5, further comprising a polarization controller and a polarization analyzer which make arbitrary polarizations linear polarizations for the transmitted signal- and reference-lights with orthogonal polarizations.

7. The optical transmitter/receiver system according to claim 6, wherein a part of light is extracted at a position before the signal light and the reference light are split, the polarization is analyzed by the polarization analyzer, and a feedback signal is sent to the polarization controller.

8. The optical transmitter/receiver system according to claim 6, wherein a part of the reference light is extracted at a position after the signal light and the reference light are split, the polarization is analyzed by the polarization analyzer, and a feedback signal is sent to the polarization controller.

9. The optical transmitter/receiver system according to claim 6, wherein a part of the signal light is extracted at a position after the signal light and the reference light are split, the polarization is analyzed by the polarization analyzer, and a feedback signal is sent to the polarization controller.

10. An optical transmitter/receiver system, comprising:
    an optical transmitter comprising:
       a quantum state generator having one light source as a pump source,
       a modulator that superimposes a signal on a quantum state that is output from the quantum state generator to provide a signal light,
       a polarization controller for the signal light that is output from the modulator, an optical delay unit that adjusts an optical path length of a reference light which is a non-quantum light that is emitted from the quantum state generator, a polarization controller for the reference light; and a polarizing beam coupler for coupling the signal light and the reference light whose polarizations are orthogonal to each other where the signal light and the reference light coincide with each other along a time axis so that the reference light traps the signal light;

an optical fiber that transmits a signal from the optical transmitter; and an optical receiver that detects, with the transmitted reference light, the transmitted quantum light that has been modulated by a transmission signal, and that reproduces the transmission signal from the detection signal, wherein the signal light is trapped by the reference light in the optical fibers connecting the transmitter with the receiver through the third-order nonlinear effect of the optical fibers.

11. The optical transmitter/receiver system according to claim 10, wherein the optical fiber comprises a polarization maintaining fiber.

12. The optical transmitter/receiver system according to claim 10, wherein the reference light that is transmitted through the optical fiber forms an optical soliton.

13. An optical transmitter/receiver system, comprising:

an optical transmitter that transmits a signal light and a reference light whose polarizations are orthogonal to each other where the signal light and the reference light are spatially and temporally superimposed on each other;

an optical fiber through which a signal from the optical transmitter is transmitted; and an optical receiver comprising:

a beam splitter that splits the signal light and the reference light whose polarizations are orthogonal to each other where the signal light and the reference light coincide with each other along a time axis so that the reference light traps the signal light, a polarization controller for the signal light, an amplifier for the reference light, a waveform shaping unit for the reference light, an optical delay unit that adjusts an optical path length of the reference light, a polarization controller for the reference light, an optical coupler/splitter for interfering the signal light and the reference light with each other, two photo-detectors that detect the signal light and the reference light which have been interfered with each other, and an electric circuit that processes the interfered signal- and reference-lights which are detected by the photo-detectors, wherein the optical fiber is connected between the optical transmitter and the optical receiver, and wherein the signal light is trapped by the reference light in the optical fibers connecting the transmitter with the receiver through the third-order nonlinear effect of the optical fibers.

14. The optical transmitter/receiver system according to claim 13, wherein the optical fiber comprises a polarization maintaining fiber.

15. The optical transmitter/receiver system according to claim 13, wherein the reference light that is transmitted through the optical fiber forms an optical soliton.

* * * * *